May 9, 1967 H. C. HERP, JR 3,318,589
DESUPERHEATER
Filed Dec. 28, 1964
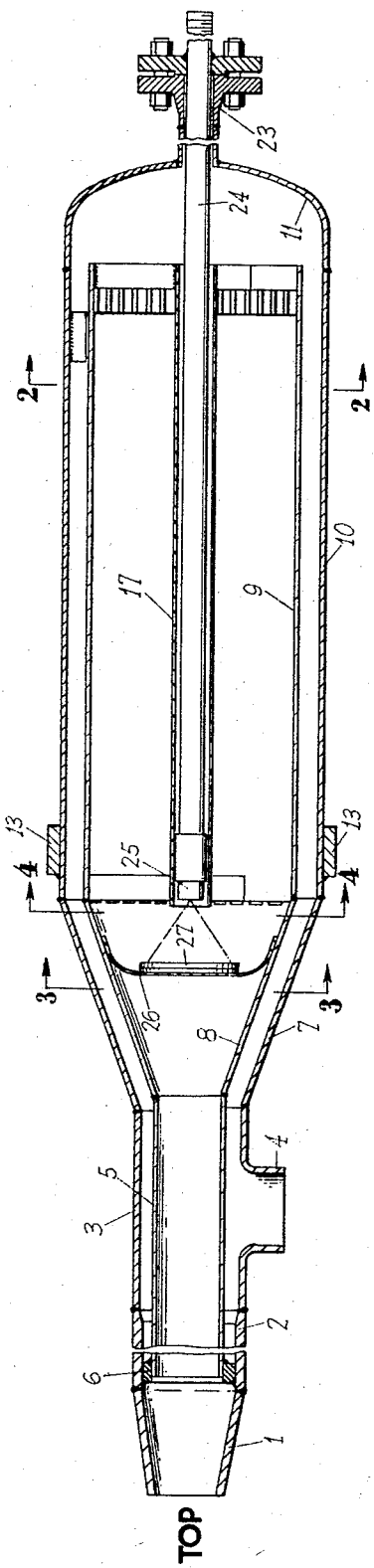
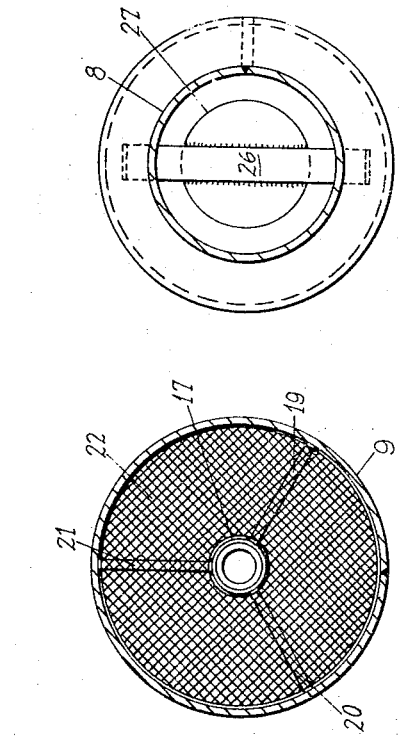
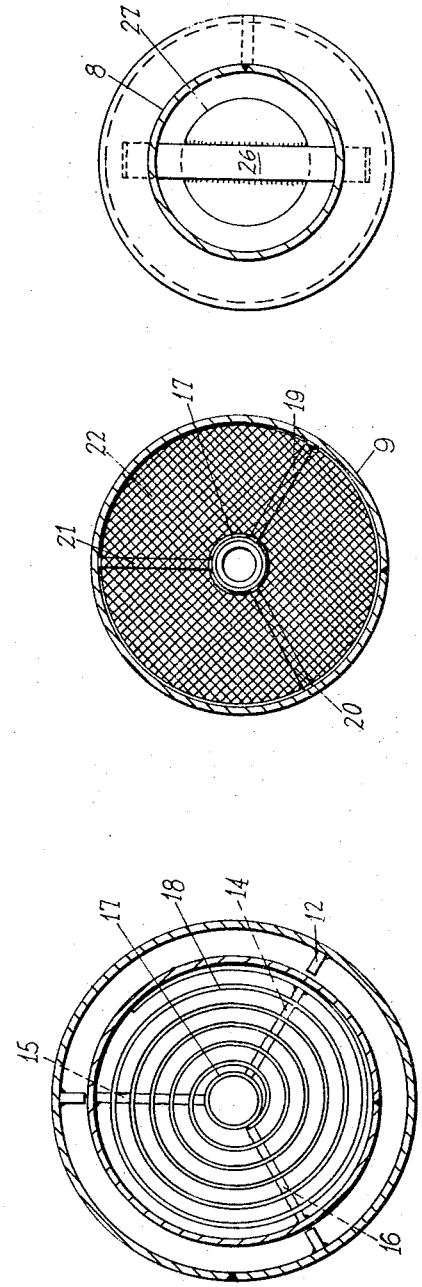
INVENTOR.
HENRY C. HERP,
BY Yungblut, Melville,
Strasser & Foster,
ATTORNEYS.

3,318,589
DESUPERHEATER
Henry C. Herp, Jr., Louisville, Ky., assignor to Girdler Corporation, Louisville, Ky., a corporation of Ohio
Filed Dec. 28, 1964, Ser. No. 421,551
8 Claims. (Cl. 261—160)

The invention relates to means for performing a rapid partial cooling of gases from a high to an intermediate temperature, and is available for use wherever the admixture of steam or water vapor with such gases is advantageous or at least not objectionable.

In order to outline a typical field of use, reference will be made to the initial cooling of the gaseous effluent from the catalyst tubes of reforming furnaces, it being understood that the utility of the invention is by no means limited thereto. There are various types of reformation reactions; but a single type may be referred to for illustrative purposes:

$$CH_4 + H_2O \rightarrow CO + 3H_2$$

Although the hydrocarbon in the above reaction is indicated as methane, the reaction may be taken as indicative of the chemical changes which occur in the reforming of naphtha and related hydrocarbons, see the copending application of Mayland, Trimarke, Harvin and Brandon, Ser. No. 372,862, filed June 5, 1964, and entitled, Process for the Catalytic Steam Reforming of Naphtha and Related Hydrocarbons, and also the copending application of Mayland and Brandon, Ser. No. 406,418, filed Oct. 26, 1964, and entitled, Process of Producing Fuel Gases by Reforming Liquid Hydrocarbons.

The nature of the reformer furnace containing the catalyst tubes, is likewise not a limitation on the invention. Reference may be made for an exemplary furnace to the copending application of Herp, Kelsall, Bowker and Bennett, Ser. No. 377,942, filed June 25, 1964, and entitled, Modular Reformer Furnace.

The reformation reactions are ordinarily carried on by passing the initail gases through tubes containing a catalyst material which is mainly of nickel, the tubes being located in a furnace wherein the application of heat to the tubes is such that the reformed gases exit from the furnace at a temperature usually between about 1400° and about 1600° F. and at an elevated pressure such as 200 p.s.i.g.

It is usual to apply some sort of cooling means to the reformed gases immediately upon their exit from the furnace. Hitherto the art has made use of an elongated cooling device containing a packing material such as stainless steel Raschig rings wherein the effluent gases are mixed with steam or condensate. A cooling is effected usually to about 700° F. so that the reformed gases can be handled and treated in succeeding parts of an apparatus which will vary in nature depending upon the use to which the gases will be put. Such cooling apparatus is frequently referred to as a desuperheater. There are a number of disadvantages to the desuperheaters hitherto employed. In the first place they are expensive because they must be made of thick plates of high alloys, such as those sold under the names Incoloy and RA 330. These present procurement and fabricating problems; but their use is dictated for the shell of the desuperheater because most parts of the shell which will be subjected both to the the highest temperatures of the incoming gases and also to the aforesaid high pressures.

It is an object of this invention to provide a desuperheater which need not be made from thick plates of high alloys.

It is also an object of the invention to provide a desuperheater in which the outer shell is not subjected to the normal high temperatures.

It is an object of the invention to provide a desuperheater having a substantially reduced cost as compared with prior art desuperheaters.

It is an object of the invention to provide a desuperheater the pressure parts of which can be made of lower alloy stainless steel such as 18% chromium, 8% nickel, and a desuperheater which will have a substantially prolonged service life.

These and other objects of the invention which will be set forth hereinafter are accomplished by that structure and arrangement of parts of which an exemplary embodiment will now be described. Reference is made to the accompanying drawings in which:

FIG. 1 is a vertical cross section of the structure of this invention.

FIG. 2 is a transverse cross section taken along the section line 2—2 of FIG. 1.

FIG. 3 is a transverse cross sectional view taken along the section line 3—3 of FIG. 1.

FIG. 4 is a transverse cross sectional view taken along the section line 4—4 of FIG. 1.

Briefly, in the practice of the invention a desuperheater is made in the form of an elongated member having an inlet for the hot gases at the top, a neck member provided with an outlet for the cooling gases, a transition member, a substantially cylindrical body, and a domed bottom closure. Within the body and spaced from the walls thereof there is a sleeve member having at its bototm a support for packing materials such as the Raschig rings aforesaid. An inlet means for steam or condensate enters through the bottom closure member and extends upwardly substantially to the top of the aforesaid sleeve. Continuations of the sleeve extend upwardly therefrom within the transition member and within the neck; and the last mentioned extension at its top is sealed to the outer neck member.

In operation, the hot gases entering the top of the desuperheater are kept away from the outer neck portion, the transition member and the cylindrical body. Instead they pass downwardly through the extensions of the inner sleeve and are diverted laterally by baffle means on the sleeve extension which parallels but is spaced from the transition member. Steam or condensate is supplied into the hot gases, the baffle plate serving also to distribute the supply. The mixture of the hot gases and steam passes downwardly through the sleeve and the packing contained therein, exiting from the sleeve at the bottom thereof. By this time the high temperature gases have been substantially cooled.

The treated gases then pass upwardly between the sleeve and the cylindrical body and between the upward extensions of the sleeve and the neck and similar portions of the housing. The housing, as will now be seen, has contact with the gases from the catalyst tubes only after these gases have been cooled. Also there is considerable heat exchange between the cooled gases on the outside of the sleeve extensions and the hot gases passing through the sleeve extensions. This still further protects the apparatus. The apparatus may also be smaller in size for a given volume of gas flow than has been the case with prior desurpeheaters. There follows a description of the structure of this invention in detail.

The desuperheater is preferably made of sections of stainless steel, which sections are welded together to make up the final structure. There is an inlet fitting 1 of such size and shape as will facilitate connection to the treated gas outlet from the furnace. A collar member 2 is welded to the inlet fitting as shown. A generally cylindrical outlet section 3 is attached to the collar, and is so shaped as to provide an outlet fitting 4 upon one side. Since the hot gases are to travel downwardly within certain extensions to the sleeve above mentioned, it may next be noted that there is an extension 5 located within the collar 2 and outlet section 3. The outer diameter of the extension 5 is substantially smaller than the internal diameters of the collar 2 and outlet section 3 as shown. The upper end of the extension 5 is welded to a ring 6 which in turn is welded to the collar 2. This ring is dimensioned to span the difference between the external diameter of the extension 5 and the internal diameter of the collar 2.

The ring element of the outer casing is a conical transition member 7, welded at its upper end to the outlet section 3. Within this transition member for the outer casing there lies a similarly shaped transition member 8 spaced from the interior walls of the member 7. The internal transition member 8 is welded at its top to the extension 5 and at its bottom to the internal sleeve member 9. The outer casing has a similarly shaped cylindrical element 10 of larger diameter and welded to the outer casing transition member 7. The sleeve element 9 is open at its bottom; and it will be evident that the hot gases from the entrance fitting 1 pass downwardly through the extension 5, the transition member 8 and the sleeve 9 of the inner structure. The gases pass out of the open bottom of the sleeve member 9 and are forced by the end closure element 11 to reverse their direction of motion and travel upwardly through the annular spaces between elements 9 and 10, elements 7 and 8, elements 5 and 3 until they reach the outlet fitting 4.

As shown in FIGS. 1 and 2, the outer cylindrical casing member 10 may be provided with internal, fin-like spacing means 12 to prevent a decentering of the sleeve 9 within the element 10. Since the desuperheater is usually suspended on the outside of the furnace from the furnace framework, it may be provided with an external ring 13 for the purpose as shown in FIG. 1.

The sleeve element 9 will be filled with packing material such as the stainless steel Raschig rings above mentioned, although other packing material may be used so long as it is capable of withstanding the temperatures involved. But at the lower end of the sleeve 9 there must be a grating or other support capable of withstanding the weight of the packing. The grating may take various forms, and the precise form is not a limitation upon the broader aspects of the invention. One suitable form is that shown in FIGS. 1 and 2. At the bottom of the sleeve 9 radially extending supporting bars 14, 15 and 16 may be welded between the sleeve 9 and an internal tube 17 later described. Three of the radial supports 14, 15 and 16 located a 120° apart will generally be found sufficient though more may be used if desired. The grating proper rests upon the radial supports and may take any suitable form. One such form is illustrated herein as consisting of a spirally configured bar 18, the convolutions of which are spaced from each other by a distance sufficient to permit the ready passage of gases while retaining the packing material. The spirally wound bar may be welded to the radial supports 14, 15 and 16.

It is desirable to provide at the top of the sleeve 9 an element which is pervious to the gases but will act to retain the packing material in position if the desuperheater is laid on its side during shipment or installation. This is also in the form of a grating previously described. As shown in FIG. 4 it may consist of a plurality of radial supports 19, 20 and 21 welded between the sleeve 9 and the internal tube 17. A wire mesh element 22 may be laid upon and welded to the radial supports after the interior of the sleeve 9 has been filled with the packing material.

The dome shaped end piece 11 of the outer casing may be welded to the end of the cylindrical portion 10 as shown in FIG. 1. It will be provided with a central fitting 23 through which a spray tube 24 extends. The spray tube will be sealed in a gas tight fashion to the fitting 23. It will be possible if desired to provide a means for the drainage of any water or other material which may condense in the casing. Since such condensation is not ordinarily encountered, a drainage opening has not been illustrated as such, although the spray tube 24 is shown as smaller in external diameter than the interior diameter of the body of the fitting 23. If drainage is desired it will be within the skill of the worker in the art to provide an external valved outlet means communicating with the space between the fitting and the spray tube. The spray tube extends to the top of the sleeve member 9 where it will be provided with a nozzle 25. The end of the spray tube extending beyond the fitting 23 will be understood as connected to a source of steam or condensate.

The tube 17 mentioned above surrounds the spray tube 24 throughout the length of the sleeve 9 and is valuable to retain the packing when the spray nozzle 25 is removed for maintenance.

Within the transition element 8 of the inner structure there is a baffle means as illustrated in FIGS. 1 and 3. While this baffle means may take various forms, a convenient structure comprises a strap element 26 the ends of which are welded or otherwise attached to the inner transition element 8. A pair of metal plates 27 form the actual baffle and are welded or otherwise attached to the strap 26. The baffle structure has two functions. The hot gases hitting it from above are diverted laterally so as to pass downwardly through the packing in the sleeve 9. The spray jet of steam or condensate formed by the nozzle 25 strikes the baffle structure from beneath and is reflected outwardly therefrom so as to become intimately mixed with the hot gases and so as to impinge upon the packing.

In the operation of the device, the hot gases from the reforming furnace pass downwardly through the extension elements 5 and 8 of the interior structure and are immediately cooled by the action of the spray. The gases do not reach the domed end closure 11, the cylindrical portion 10, the transition member 7 and the exit element 3 of the outer casing until after they have been substantially cooled. Thus the outer casing of the desuperheater need not be constructed throughout either of special alloys or of very thick plates. While, in a typical example it may be well to construct the entrance fitting 1 and the collar 2 of high alloy stainless steel having a thickness of about 5/16 inch, the remainder of the external casing may be constructed of lower alloy stainless steel elements no more than about 3/16 inch in thickness. As previously indicated the hot gases from the catalyst tube of the furnace may have a temperature within the range of about 1400° to about 1600° F., and a pressure of 200 p.s.i.g., the gases will be cooled to a substantially lower temperature, usually in the neighborhood of 700° F. so that not only the outer casing but also a part of the internal elements will be protected from excessive temperatures.

It may be noted that the temperatures of the gases, however, may be such as to support the water-gas reaction where the gases from the catalyst tubes contain considerable quantities of carbon monoxide and a large quantity of the last mentioned gas is not ordinarily desired. The water-gas reaction, as is well known, is:

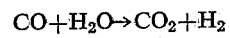
$$CO + H_2O \rightarrow CO_2 + H_2$$

Modifications may be made in the invention without departing from the spirit of it.

The embodiments of the invention in which an exclusive property or privilege is claimed are defined as follows:

I claim:

1. In an apparatus for the purpose described, an outer casing comprising an entrance fitting, a collar, a member having an exit fitting, a transition member, a cylindrical member and an end closure member, and an inner structure comprising a cylindrical sleeve open at one end, a transition member and a tubular extension, the said parts of the inner structure being located within corresponding parts of the outer structure and spaced therefrom so as to provide a passageway for gas between the structures, means connecting an end of the said tubular extension of the inner structure to said collar in a gas tight fashion whereby gases entering the said entrance fitting are caused to traverse the inner structure to the closed end of the outer structure and then to return in the annular spaces between the inner and outer structures to the exit fitting, and means in the said sleeve to cool said gases.

2. The structure claimed in claim 1 wherein the end closure of the outer structure is provided with a fitting, a spray tube extending through said fitting to the opposite end of said sleeve and provided with a nozzle for cooling fluid.

3. The structure claimed in claim 2 wherein the open end of said sleeve is provided with a gas-pervious grating to support a filling of packing material within said sleeve.

4. The structure claimed in claim 3 including a grating at the opposite end of said sleeve for retaining said packing material.

5. The structure claimed in claim 4 including a tubular sheath for said spray tube fastened to the said gratings and covering the said spray tube throughout the length of said sleeve.

6. The structure claimed in claim 5 wherein the transition member of the inner structure is provided with baffle means for spreading the hot gases passing through said inner structure, said baffle means being located in the path of a spray from the nozzle of said spray tube whereby to divert the spray of cooling fluid and assist in its intimate admixture with the said hot gases.

7. The structure claimed in claim 6 wherein the packing within said sleeve member comprises stainless steel Raschig rings.

8. The structure claimed in claim 7 wherein the said inner structure is fabricated of high alloy stainless steel parts, and the outer structure of lower alloy stainless steel parts.

References Cited by the Examiner

UNITED STATES PATENTS

| | | |
|---|---|---|
| 2,276,055 | 3/1942 | Mastenbrook. |
| 2,654,584 | 10/1953 | Hedberg _____ 261—115 X |
| 3,121,127 | 2/1964 | Hedin _____ 261—116 X |

FOREIGN PATENTS

| | | |
|---|---|---|
| 335,803 | 12/1903 | France. |
| 298,075 | 11/1928 | Great Britain. |
| 27,311 | 9/1902 | Switzerland. |
| 344,028 | 3/1960 | Switzerland. |

HARRY B. THORNTON, *Primary Examiner.*

RONALD R. WEAVER, *Examiner.*